United States Patent
Duvvuru

(10) Patent No.: US 7,308,004 B1
(45) Date of Patent: Dec. 11, 2007

(54) METHOD AND APPARATUS OF MULTIPLEXING AND DEMULTIPLEXING COMMUNICATION SIGNALS

(75) Inventor: Ramesh Duvvuru, San Jose, CA (US)

(73) Assignee: Redback Networks, Inc., San Jose, CA (US)

( * ) Notice: Subject to any disclaimer, the term of this patent is extended or adjusted under 35 U.S.C. 154(b) by 1077 days.

(21) Appl. No.: 10/102,456

(22) Filed: Mar. 20, 2002

Related U.S. Application Data

(60) Provisional application No. 60/362,208, filed on Mar. 6, 2002.

(51) Int. Cl.
  *H04J 7/00* (2006.01)
  *H04J 1/00* (2006.01)
  *H04B 3/46* (2006.01)

(52) U.S. Cl. .............. 370/484; 370/503; 370/506; 370/535; 370/536; 375/219; 375/222; 375/223; 375/224

(58) Field of Classification Search .............. 370/484, 370/503–545, 240, 252; 379/22; 375/223–224, 375/219, 222
See application file for complete search history.

(56) References Cited

U.S. PATENT DOCUMENTS

| | | | |
|---|---|---|---|
| 4,914,655 A * | 4/1990 | Johannes et al. | 370/540 |
| 5,121,342 A * | 6/1992 | Szymborski et al. | 709/224 |
| 5,400,369 A | 3/1995 | Ikemura | |
| 5,452,333 A * | 9/1995 | Guo et al. | 375/371 |
| 5,533,018 A | 7/1996 | DeJager et al. | |
| 5,541,921 A | 7/1996 | Swenson et al. | |
| 5,550,820 A | 8/1996 | Baran | |
| 5,608,731 A | 3/1997 | Upp et al. | |
| 5,621,773 A | 4/1997 | Varma et al. | |
| 5,661,778 A * | 8/1997 | Hall et al. | 379/29.01 |
| 5,768,269 A * | 6/1998 | Rakib et al. | 370/342 |
| 5,793,759 A * | 8/1998 | Rakib et al. | 370/342 |
| 5,805,571 A | 9/1998 | Zwan et al. | |
| 5,825,770 A | 10/1998 | Coady et al. | |
| 5,923,667 A | 7/1999 | Poiraud et al. | |
| 5,963,564 A | 10/1999 | Petersen et al. | |
| 5,991,312 A | 11/1999 | Koenig et al. | |

(Continued)

OTHER PUBLICATIONS

Bob Bridge; AT&T 62411 Design Considerations—Jitter and Synchronization; www.crystal.com; Crystal Semiconductor Corporation 1996; Jun. 1994; AN12REV2; pp. 1-14.

*Primary Examiner*—Edan Orgad
*Assistant Examiner*—Venkatesh Haliyur
(74) *Attorney, Agent, or Firm*—Blakely, Sokoloff, Taylor & Zafman, LLP

(57) ABSTRACT

A method and apparatus for multiplexing and demultiplexing communication signals are described herein. In one embodiment, an apparatus includes first sample logic to sample a plurality of communication signals each including a clock component and a non-clock component. The first sample logic includes a first multiplexer to receive the clock components and a second multiplexer to receive the non-clock components. In addition, a first counter is coupled to a control input of the first multiplexer and the second multiplexer. A capture unit including a non-clock component storage element coupled to an output of the second multiplexer and edge detection logic is coupled to an output of the first multiplexer to detect a transition of a clock component and coupled to a control input of the non-clock component storage element.

15 Claims, 12 Drawing Sheets

U.S. PATENT DOCUMENTS

| | | | |
|---|---|---|---|
| 6,036,091 A * | 3/2000 | Spitz | 235/462.25 |
| 6,154,456 A * | 11/2000 | Rakib et al. | 370/342 |
| 6,157,659 A | 12/2000 | Bird | |
| 6,167,062 A | 12/2000 | Hershey et al. | |
| 6,185,635 B1 | 2/2001 | O'Loughlin et al. | |
| 6,188,693 B1 | 2/2001 | Murakami | |
| 6,198,751 B1 | 3/2001 | Dorsey et al. | |
| 6,208,169 B1 * | 3/2001 | Wong et al. | 326/93 |
| 6,237,029 B1 | 5/2001 | Master et al. | |
| 6,275,510 B1 | 8/2001 | Koenig et al. | |
| 6,285,673 B1 | 9/2001 | Blackburn et al. | |
| 6,320,877 B1 | 11/2001 | Humphrey et al. | |
| 6,356,555 B1 * | 3/2002 | Rakib et al. | 370/441 |
| 6,400,682 B1 * | 6/2002 | Regula | 370/223 |
| 6,430,696 B1 * | 8/2002 | Keeth | 713/503 |
| 6,498,791 B2 * | 12/2002 | Pickett et al. | 370/353 |
| 6,901,126 B1 * | 5/2005 | Gu | 375/355 |
| 6,907,552 B2 * | 6/2005 | Collins | 714/700 |
| 6,950,446 B2 * | 9/2005 | McClary et al. | 370/503 |
| 6,961,348 B2 * | 11/2005 | Yu | 370/466 |
| 6,987,817 B1 * | 1/2006 | Reuveni | 375/340 |
| 7,016,403 B2 * | 3/2006 | Hirt et al. | 375/224 |
| 2001/0033580 A1 | 10/2001 | Dorsey et al. | |
| 2002/0018468 A1 | 2/2002 | Nishihara | |
| 2002/0181404 A1 * | 12/2002 | Insler et al. | 370/241 |
| 2003/0016734 A1 * | 1/2003 | Blake | 375/219 |
| 2004/0136411 A1 * | 7/2004 | Hornbuckle et al. | 370/537 |

\* cited by examiner

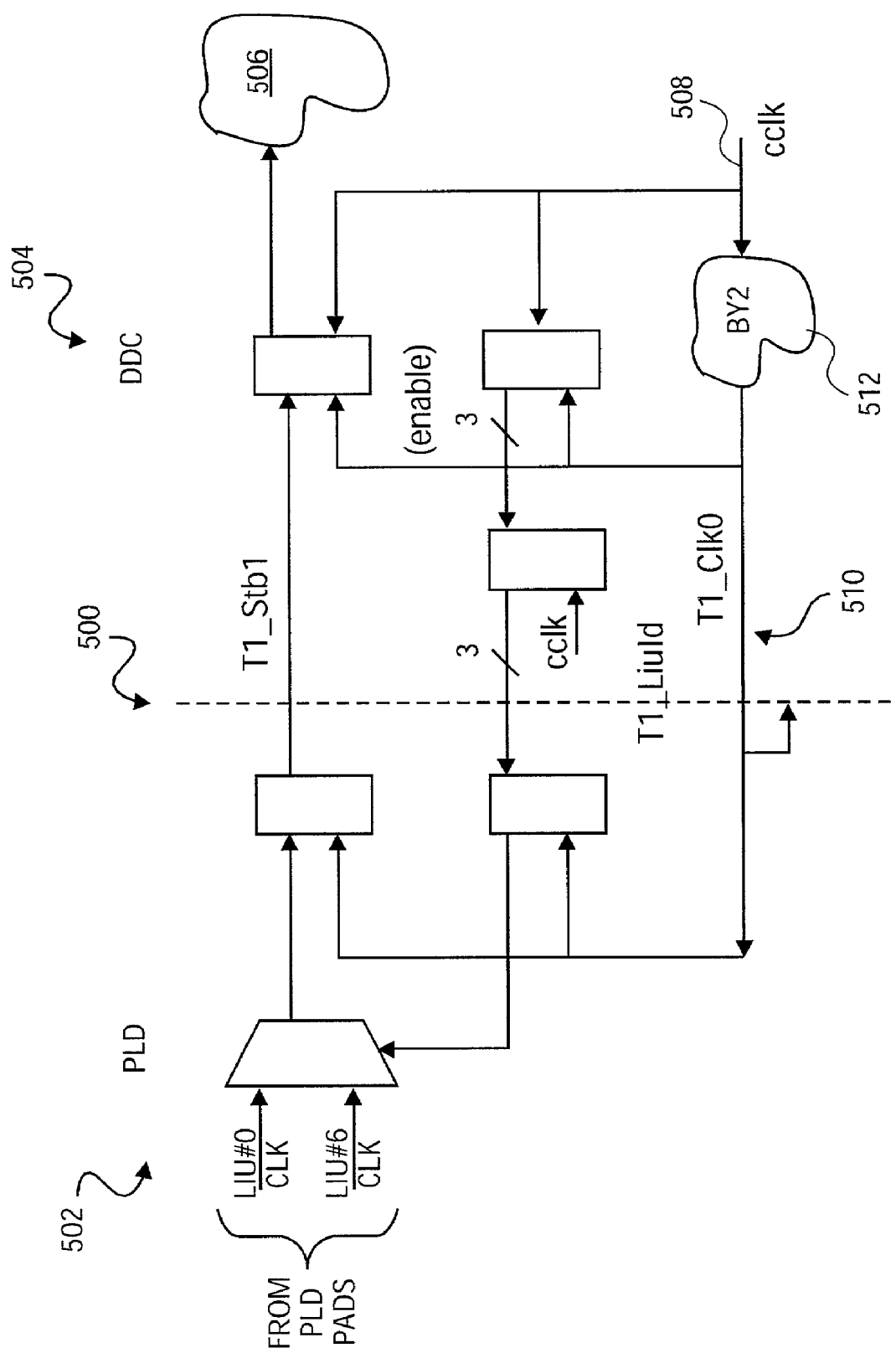

ated by dashed line 100, to communication signal processing unit 104.
METHOD AND APPARATUS OF MULTIPLEXING AND DEMULTIPLEXING COMMUNICATION SIGNALS

CROSS-REFERENCE TO RELATED APPLICATIONS

This application claims the benefit of priority from U.S. Provisional Patent Application Ser. No. 60/362,208 entitled "Method and Apparatus of Multiplexing and Demultiplexing Communication Signals" filed on Mar. 6, 2002.

TECHNICAL FIELD

The invention relates generally to the field of communications networks. More specifically, the invention relates to a method and system of multiplexing and demultiplexing communication signals.

BACKGROUND

Conventional communication networks include network elements (e.g., routers, bridges, gateways, switches, hubs, and/or hosts) which transmit and receive communication signals. A communication signal may include one or more components (e.g., a clock component and a set of one or more non-clock components such as a data component, a status component, and/or a control component) embodied within one or more associated signals or encoded within a single communication signal.

T-1 communication signals, for example, are synchronous communication signals each including a data component encoded utilizing one or more line codes such as pulse code modulation (PCM), Alternate Mark Inversion (AMI), Bipolar with Eight Zero Substitution (B8ZS), or the like and an independent clock component utilized in various implementations to transfer data payloads and to synchronize communication between various network elements. T-1 communication signals support full-duplex communication at signaling rates up to 1.554 Mbps utilizing a signal period of approximately 647 ns. A T-1 communication signal may also include additional non-clock components such as a Line Code Violation (LCV) component to indicate potential data component errors and/or a Loss of Signal (LOS) component to indicate the lack of an incoming signal. Other examples of communication signals having a clock component and one or more non-clock components include T-3, E-1, E-3, J-1, J-3, etc.

A typical network element includes a number of line cards coupled together via an interconnect (e.g., a mesh, one or more control cards, or the like). Each line card in turn includes: 1) a number of line interface units coupled to communication signal lines via ports for receiving and transmitting communication signals; and 2) one or more communication signal processing units to process communication signals.

FIG. 1 illustrates a portion of a network element line card according to the prior art. The illustrated line card portion includes a communication signal line interface unit 102 for each communication signal received over a number of communication signal lines 106A-106Z and a communication signal processing unit 104. Each of the communication signal line interface units 102A-102Z receives a communication signal and processes the received communication signal to extract various components (e.g., clock components 108A-108Z and non-clock components 110A-110Z). The extracted components of each received communication signal are then provided from each of the communication signal line interface units 102A-Z across a boundary, illustrated by dashed line 100, to communication signal processing unit 104.

Communication signal processing unit 104 includes a duplicate group of storage elements 112A-112Z for each of the communication signals received over communication signal lines 106A-106Z. Each group of storage elements 112A-112Z in turn includes a separate storage element for each non-clock component of its corresponding communication signal. Each group of storage elements 112A-112Z receives the extracted clock component 108A-108Z of its corresponding communication signal to control the storage and/or additional processing of the remaining non-clock components.

In the prior art embodiment illustrated in FIG. 1, one or more non-clock components 112A.A and 112Z.A (e.g., data components) from each group are then provided to a separate corresponding deframer 114A-Z and deframed while one or more remaining non-clock components 112A.D and 112Z.D (e.g., line code violation and/or loss of signal components) are provided to separate corresponding error monitoring logic 113A-Z. For each of the communication signals, the deframed communication signal may either be retained for further processing or may be immediately re-transmitted in a process known as "loopback". A duplicate switch 116A-Z corresponding to each deframer 114A-114Z receives the deframed communication signal and provides it either to a separate jitter buffer 118A-Z for loopback or to a separate payload buffer 120A-Z for further processing.

A given deframed communication signal is stored into its respective one of the jitter buffers 118A-118Z for loopback transmission using the extracted clock component of that communication signal. A given communications signal is transmitted out of its jitter buffer using either that communication signal's extracted clock or an external clock (a clock other than a communication signal's extracted clock component). When an external clock is utilized for loopback transmission, jitter (referred to herein as "external clock jitter") is introduced. "Jitter" is the deviation in or displacement of some aspect of the pulses in a digital signal where the deviation can be in terms of amplitude, phase timing, or the width of the signal pulse. Jitter buffers 118A-Z are utilized to buffer the communication signals prior to loopback transmission to decrease the amount of jitter present.

As illustrated in FIG. 1, storage elements, deframers, switches, jitter buffers, and payload buffers are duplicated for each received communication signal within a typical line card of a conventional network element. Similarly, each of the clock components 108A-Z and non-clock components 110A.A-110Z.D is received by communication signal processing logic 104 on a separate contact (not illustrated) across the boundary between the communication signal line interface units 102A-102Z and the communication signal processing unit 104. As the number of communication signals received per line card and/or components per communication signal increases, the amount of logic and the number of individual contacts and consequently the cost, power consumption, and "form factor" or size of communication signal processing logic 104 also increases.

SUMMARY OF THE INVENTION

A method and apparatus for multiplexing and demultiplexing communication signals are described herein. In one embodiment, an apparatus includes first sample logic to sample a plurality of communication signals each including a clock component and a non-clock component. The first sample logic includes a first multiplexer to receive the clock components and a second multiplexer to receive the non-clock components. In addition, a first counter is coupled to a control input of the first multiplexer and the second multiplexer. A capture unit including a non-clock component storage element coupled to an output of the second multiplexer and edge detection logic is coupled to an output of the first multiplexer to detect a transition of a clock component and coupled to a control input of the non-clock component storage element.

BRIEF DESCRIPTION OF THE DRAWINGS

The invention is illustrated by way of example and not limitation in the figures of the accompanying drawings in which similar references are utilized to indicate similar elements and in which:

FIGS. 2A-1 and 2A-2, illustrates a first receive-side portion of a network element line card according to one embodiment of the invention;

FIGS. 4A-1 and 4A-2, illustrates a first transmit-side portion of a network element line card according to one embodiment of the invention;

FIGS. 4B-1 and 4B-2, illustrates a second transmit-side portion of a network element line card according to one embodiment of the invention;

FIG. 5 illustrates a receive-side portion of a network element line card according to one embodiment of the invention.

DETAILED DESCRIPTION

A method and system of multiplexing and demultiplexing communication signals are described herein. In the following detailed description, numerous specific details have been set forth in order to provide a more thorough understanding of embodiments of the invention. It should be evident however, that these and other specific details described herein need not be utilized to practice the invention. In other circumstances, well-known structures, elements, operations, or connections have been omitted, or have not been described in particular detail in order to avoid unnecessarily obscuring the invention.

Figure 1A:
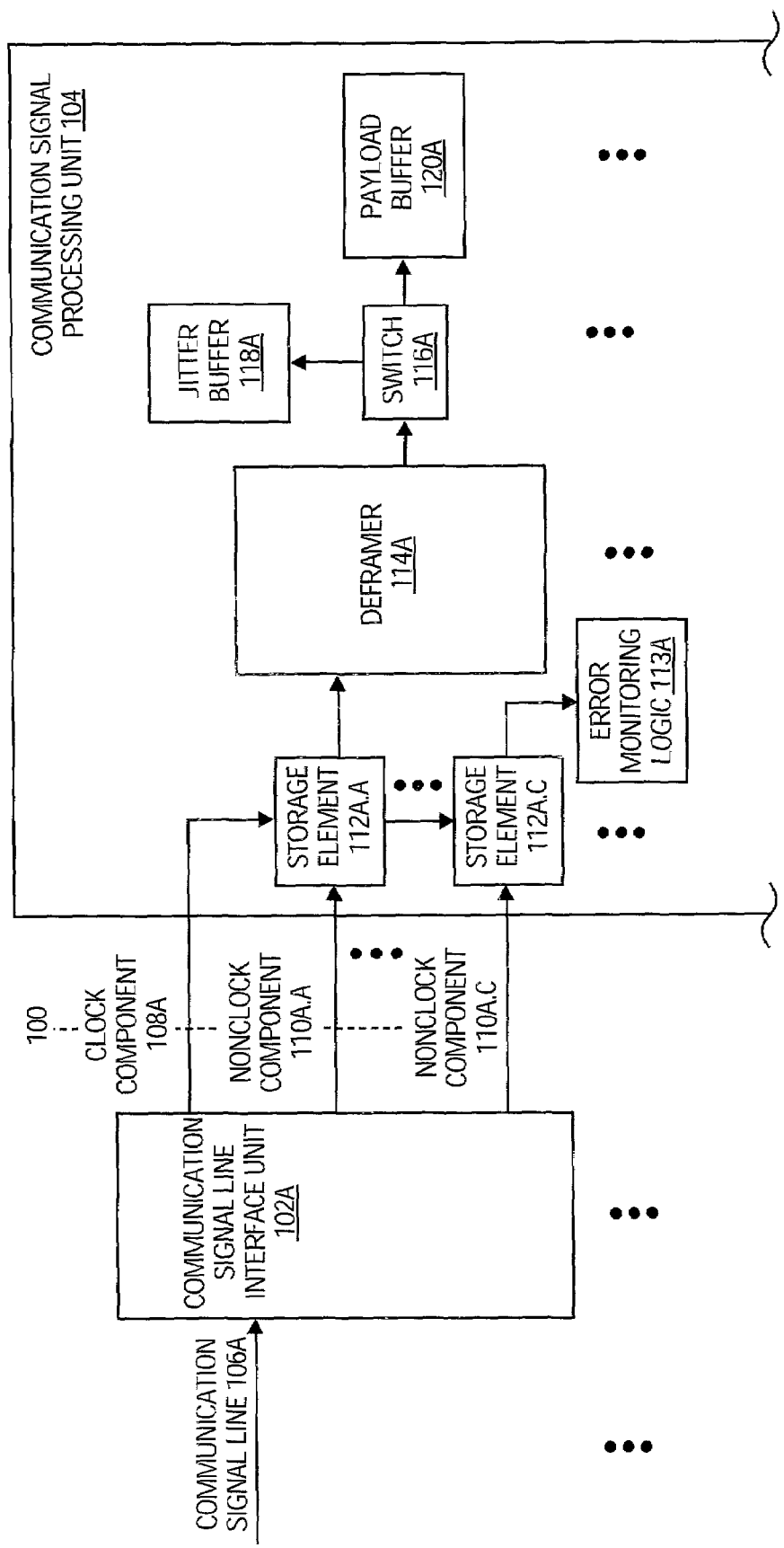
FIGS. 1A and 1B, illustrates a portion of a network element line card according to the prior art.
Figure 1B:
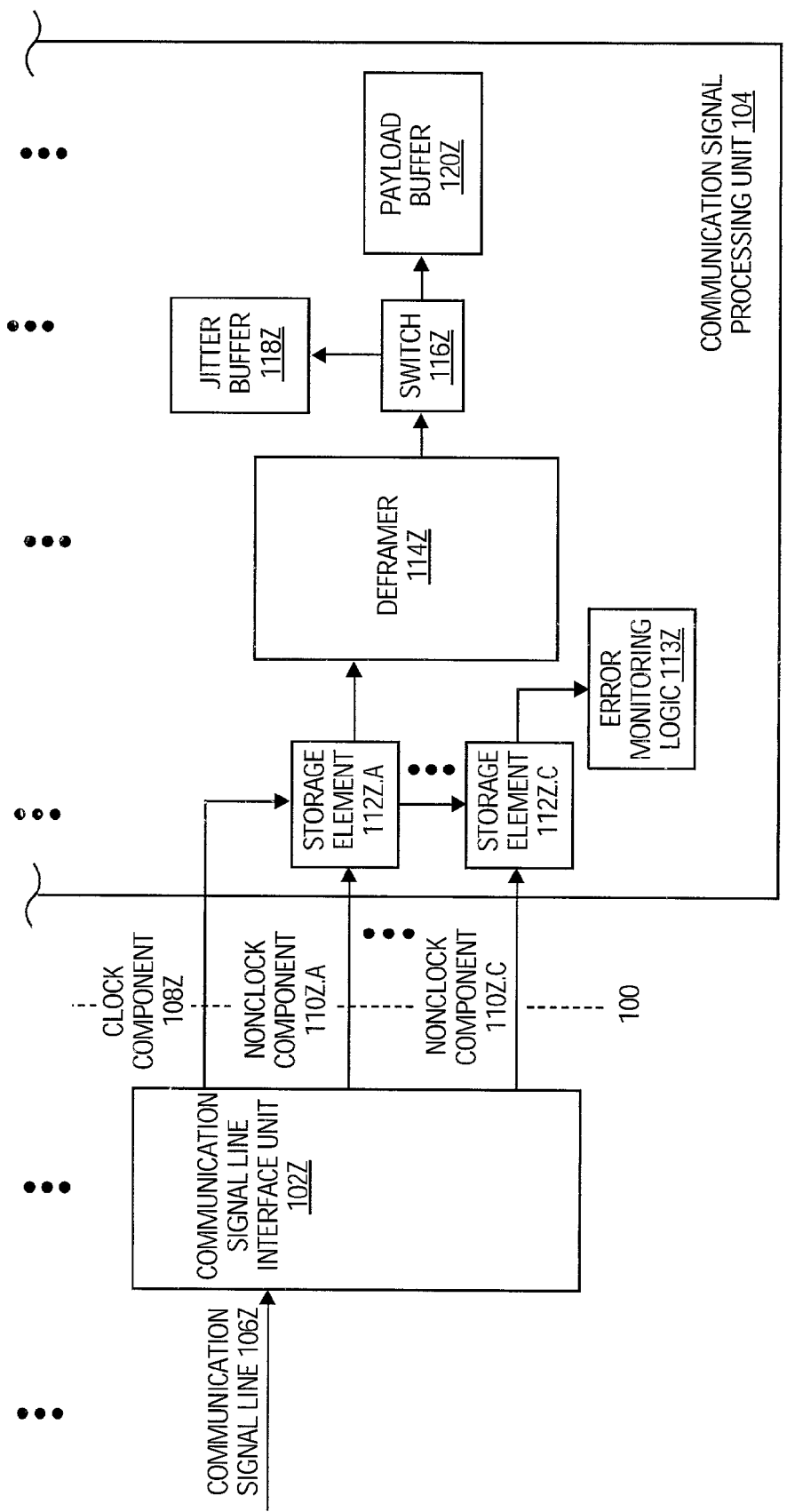
Figures 1, 2A:
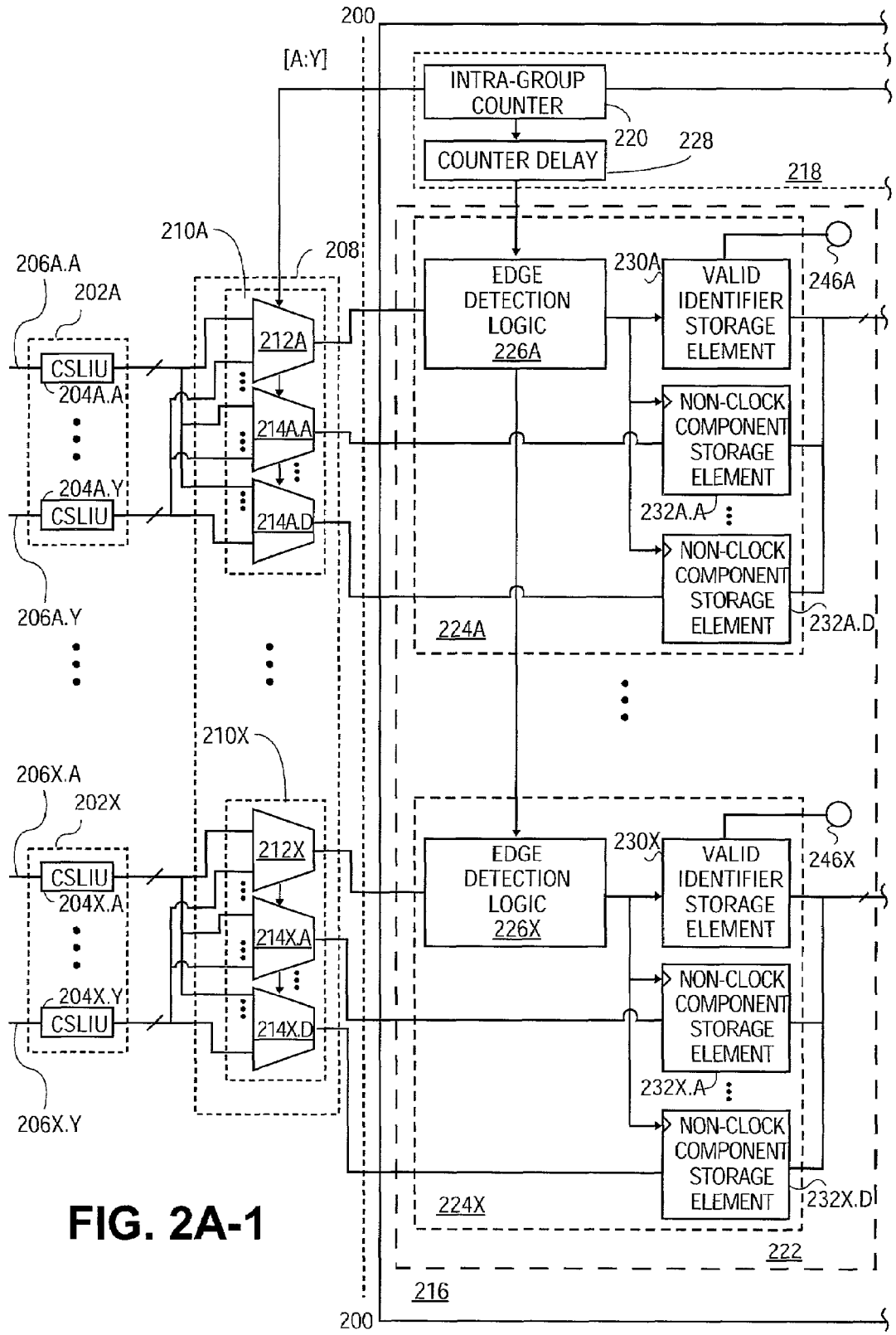
FIG. 1, including
FIG. 2A, including

FIG. 2A illustrates a first receive-side portion of a network element line card according to one embodiment of the invention. The illustrated network element line card portion includes a receive-side communication signal line interface unit (LIU) 204 for each communication signal received over a number of receive-side communication signal lines 206A.A-206X.Y organized into a set of one or more receive-side LIU groups 202A-202X, as well as a receive-side LIU sampling unit 208 and a communication signal processing unit 216 separated by a boundary illustrated by dashed line 200.

Communication signal processing unit 216 of the illustrated embodiment includes a receive-side control unit 218, a receive-side capture unit 222, receive-side capture unit sampling logic 234, and a read unit 240. In alternative embodiments of the invention, the placement or arrangement of the various described components may be varied, e.g., in one embodiment a receive-side capture unit 222 may be embodied within a separate chip/device independent of communication signal processing unit 216 or incorporated with receive-side LIU sampling unit 208 into a single device/chip. Similarly, in alternative embodiments of the invention, communication signal processing unit 216 and receive-side LIU sampling unit 208 may include a greater or lesser number of components.

While FIG. 2A illustrates a network element line card portion including multiple receive-side LIU groups 202A-202X, alternative embodiments having a single receive-side LIU group 202 will be described later herein. The accompanying figures, including FIG. 2A, utilize similar numerical and alphabetical references to indicate similar elements as well as relationships between the various depicted elements. For example, the illustrated embodiment includes a set of one or more receive-side LIU groups each designated with the reference number 202 to illustrate the relation (e.g., similarity or identity) of the elements themselves and a reference letter "A-X" to designate a specific element. There are therefore "A-X" individual receive-side LIU groups 202A-X which may correspond to any physical number of groups. For example, alternative embodiments of the invention may include no groups, a single group, an individual group for each communication signal received, etc.

Utilizing this identification or labeling scheme, sub-elements of the described receive-side LIU groups 202A-202X may be identified by the group-identifying letter. For example, each receive-side LIU group 202 (e.g., receive-side LIU group 202A) includes "A-Y" receive-side LIUs which may be designated by a first letter identifying their relation to a receive-side LIU group (202A) as well as a second letter separated from the first letter by a period (e.g., receive-side LIU 204A.A) and identifying a specific receive-side LIU.

Consequently, elements of the accompanying figures may be referenced at varying levels of granularity. For example, receive-side communication signal lines shown in FIG. 2A may be referenced together as a single group (e.g., receive-side communication signal lines 206), by group (e.g., receive-side communication signal lines 206A), or individually (e.g., receive-side communication signal line 206A.C). Similarly, correspondence between various elements within the accompanying figures may be illustrated utilizing the described labeling scheme. For example, the receive-side LIU sampling unit 208 of the embodiment illustrated by FIG. 2A includes "A-X" receive-side LIU sampling circuits 210A-210X corresponding to the "A-X" receive-side LIUs 204A-204X.

The labeling scheme may further be utilized to illustrate the potential reduction in the number of inputs/contacts between the receive-side LIUs 204A.A-204X.Y and communication signal processing unit 216 achievable utilizing embodiments of the invention such as that illustrated by FIG. 2A. According to one embodiment, including A.A-X.Y communication signals having K components each being received by communication signal processing unit 216, and A.A-X.Y communication signals having L components each being transmitted by communication signal processing unit 216, the total number of required contacts is reduced from: $(X.Y*K)+(X.Y*L)$ to:

$$[(X.Y*K)/(X.Y/X)]+[(X.Y*L)/(X.Y/X)]+[\log_2 Y]+1$$

Where the first element represents the number of receive-side contacts, the second element represents the number of transmit-side contacts, the third element represents the number of contacts for an intra-group counter or other identifier with an additional contact for a clock signal. Consequently, in an embodiment in which there are 28 receive-side communication signals having 4 components each and 28 transmit-side communication signals having 2 components each, and there are 4 groups of 7 communication signals each, the number of required contacts is reduced from 168 to 28, or a savings of approximately 83%. However, as described later herein, alternative embodiments can have other implementations (e.g., the number of groups on the receive-side may differ from the number on the transmit side).

Each of the receive-side communication signal line interface units 204A.A-204X.Y receives a communication signal via a corresponding receive-side communication signal line 206A.A-206X.Y and processes the received communication signal to extract various components (e.g., a clock component and a set of one or more non-clock components for each). The extracted components of each received communication signal are then provided from each receive-side LIU group 202A-202X of receive-side communication signal line interface units 204A.A-204X.Y to a corresponding one of receive-side LIU sampling circuits 210A-210X within receive-side LIU sampling unit 208.

Receive-side LIU sampling circuits 210A-210X in turn include receive-side clock component multiplexers 212A-212X and a set of one or more receive-side non-clock component multiplexers 214A.A-214X.D to sample the extracted communication signal components. Receive-side multiplexers 212A-212X and 214A.A-214X.D are controlled utilizing a receive-side intra-group counter 220 (counting from A to Y in the illustrated embodiment) generated within receive-side control unit 218. In an alternative embodiment of the invention, receive-side intra-group counter 220 may be generated outside of receive-side control unit 218 for example, within receive-side LIU sampling unit 208. In one embodiment of the invention, Y is equal to 7 and receive-side intra-group counter is a 3-bit counter.

Accordingly, receive-side intra-group counter 220 acts as a local LIU ID, identifying a particular communication signal for sampling with the receive-side LIU groups 202A-202X. In one time-division-multiplexing embodiment of the invention, within each receive-side LIU group 202A-202X, receive-side intra-group counter 220 defines a unique time slot in which to sample from each receive-side communication signal LIU 204 within the receive-side LIU group at a corresponding receive-side LIU sampling circuit. Where the period of the sampled communication signal is not a multiple of the period of the receive-side intra-group counter 220, the received communication signal may be over-sampled and the variation between the two periods may introduce jitter (referred to herein as "sampling jitter").

Receive-side capture unit 222 within communication signal processing unit 216 of the illustrated embodiment includes a receive-side capture circuit 224 for each receive-side sampling circuit 210A-210X in receive-side LIU sampling logic 208. A sampled clock component is applied from each receive-side clock component multiplexer 212A-212X to a corresponding receive-side edge detection logic 226A-226X in the illustrated embodiment. Receive-side edge detection logic 226 is driven using the same receive-side intra-group counter 220 applied to the various clock component multiplexers 212 and non-clock component multiplexers within receive-side LIU sampling unit 208 after a delay 228 is applied to synchronize the operation of the corresponding sampling and capture circuits. In alternative embodiments of the invention, delay 228 may be statically or dynamically programmable and may include one or more storage elements to buffer a delayed value of the receive-side intra-group counter 220.

The delayed receive-side intra-group counter identifies the particular clock component/communication signal being processed by receive-side edge detection logic 226A-226X within receive-side capture unit 222 consistently without requiring a complex signal identification or verification process or a large amount of additional data transfer between communication signal processing unit 216 and receive-side LIU sampling logic 208. Receive-side edge detection logic 226A-226X each receive a sampled clock component from a corresponding receive-side clock component multiplexer 212A-212X and determine when the sampled clock component transitions state.

Receive-side edge detection logic 226 may include buffers or other storage elements for buffering a sampled clock component's value for a given communication signal and comparing the clock component's currently received value with its immediately preceding value to determine if a clock edge/change/transition has occurred. Thus, each edge detection logic 226A-X stores state for each of the clock components in its group of communication signals 206A-X. Moreover, receive-side edge detection logic 226A-226X may be utilized to detect all changes in an applied, sampled clock component or may be utilized to detect select transitions (e.g., only high to low transitions in an embodiment including a two state clock).

Receive-side edge detection logic 226A-226X additionally controls the capture/storage of valid identifiers within receive-side valid identifier storage elements 230A-230X and one or more non-clock components within receive-side non-clock component storage elements 232A.A-232X.D upon detection of a transition of a received, sampled clock component as previously described. When receive-side edge detection logic 226A-226X determines a relevant transition has occurred, a value of a valid identifier stored within the receive-side edge detection logic's receive-side valid identifier storage element 230A-230X is altered to indicate that the transition has occurred and to cause receive-side non-clock component storage elements 232A.A-232X.D to capture their receive-side non-clock components utilizing a write-enable control input or other similar mechanism. Modification of the valid identifier within a particular receive-side valid identifier storage element 230A-230X therefore additionally indicates in one embodiment that valid non-clock components are present within receive-side non-clock component storage elements 232A.A-232X.D. In one embodiment, the valid identifier acts as a captured clock component as it conveys when a transition in the sampled clock component has occurred. Thus, the captured clock component acts as a clock itself, and is referred to as the captured clock.

Captured receive-side valid identifiers and non-clock components stored within receive-side valid identifier storage elements 230A-230X and receive-side non-clock component storage elements 232A.A-232X.D are then provided to capture unit sampling logic 234 which includes a group selection multiplexer 236. In one embodiment, multiplexer 236 is controlled utilizing an receive-side inter-group counter 238 (counting from A to X in the illustrated embodiment) generated within receive-side control unit 218, which selects a group of received valid identifiers and non-clock components to be provided to read unit 240. In alternative embodiments of the invention, receive-side inter-group counter 238 may be generated outside of receive-side control unit 218.

In one embodiment of the invention, receive-side inter-group counter 238 is further utilized to control receive-side intra-group counter 220. According to such an embodiment, receive-side inter-group counter 238 causes receive-side intra-group counter 220 to be incremented once the receive-side inter-group counter 238 reaches its maximum value. According to another embodiment of the invention, receive-side intra-group counter 220 causes receive-side inter-group counter 238 to be incremented upon reaching its maximum value. According to yet another embodiment of the invention, where the number of groups and signals per group are both a power of two, portions (e.g., the most or least significant bits) of a single counter may be utilized rather than separate intra-group and inter-group counters with the entire value of the single counter being utilized as the receive-side global LIU ID (i.e., the output of combined counter 244 within control unit 218).

Once a sample (including a valid identifier and a set of one or more non-clock components) of one of the sampled communication signals has been selected by group selection multiplexer 236, read unit 240 receives the selected valid identifier and non-clock components utilizing time sliced read circuit 242. Time sliced read circuit 242 receives the output of capture unit sampling logic 234 and a global LIU ID from control unit 218 which identifies both a group and a particular receive-side LIU 204 within the group which has been selected/sampled using receive-side LIU sampling logic 208 and receive-side capture unit sampling logic 234. The global LIU ID is produced in the illustrated embodiment by combining receive-side intra-group counter 220 and receive-side inter-group 238 counter via counter combiner 244 within control unit 218. Accordingly, in one embodiment, the global LIU ID runs from A.A to X.Y to uniquely identify each receive-side LIU 204 and its associated communication signals. In an alternative embodiment, counter combiner 244 may be omitted and the output of intra-group counter 220 and inter-group counter 238 may be concatenated or otherwise combined without the need for additional logic and/or storage elements.

Time sliced read circuit 242 receives the samples from the group selection multiplexer 236 and checks their associated valid identifier to determine if valid non-clock components are present within receive-side non-clock component storage elements 232A.A-232X.D. If the selected receive-side LIU's valid identifier indicates valid non-clock components (a clock transition was detected), time sliced read circuit 242 stores the corresponding sample of the communication signal components and alters the valid identifier of that group utilizing a valid identifier control signal 246A-246X to indicate that the sample of that communication signal has been read and that valid non-clock components are no longer present within non-clock component storage elements 232.

Figures 2, 2A:
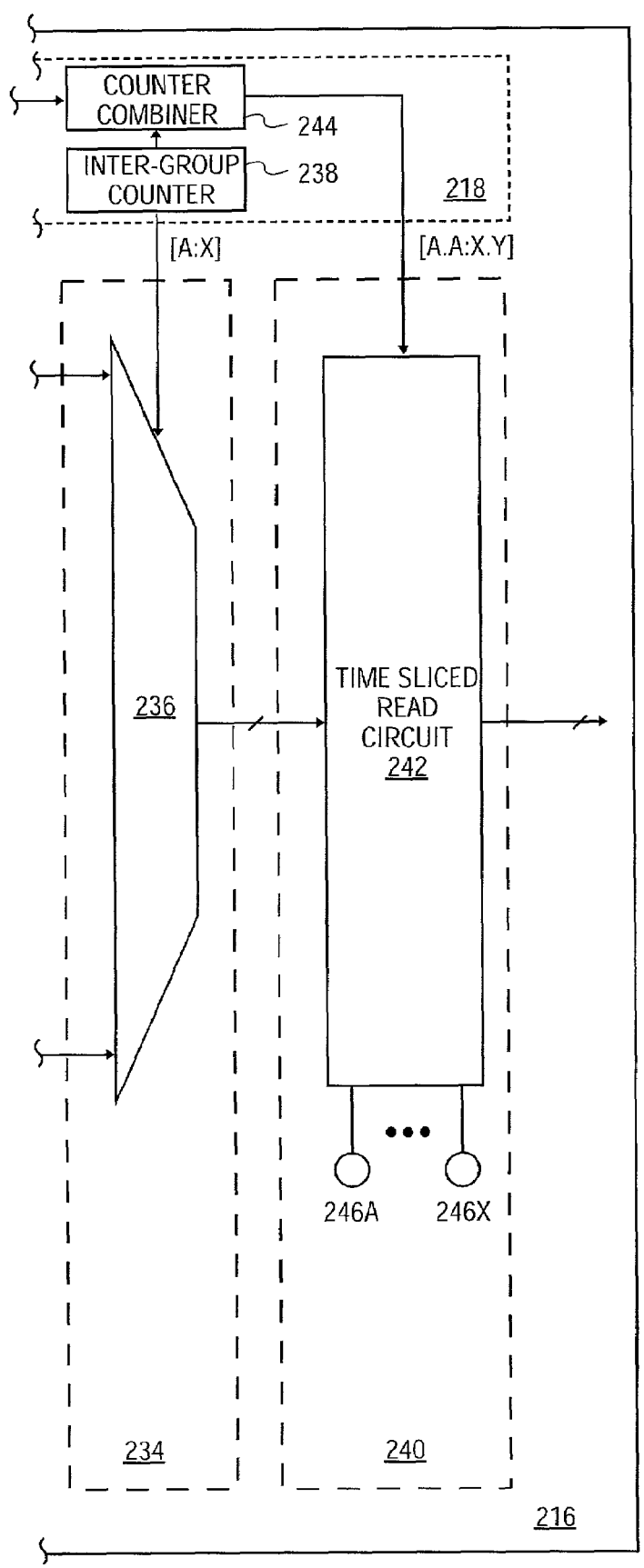
Figure 2B:
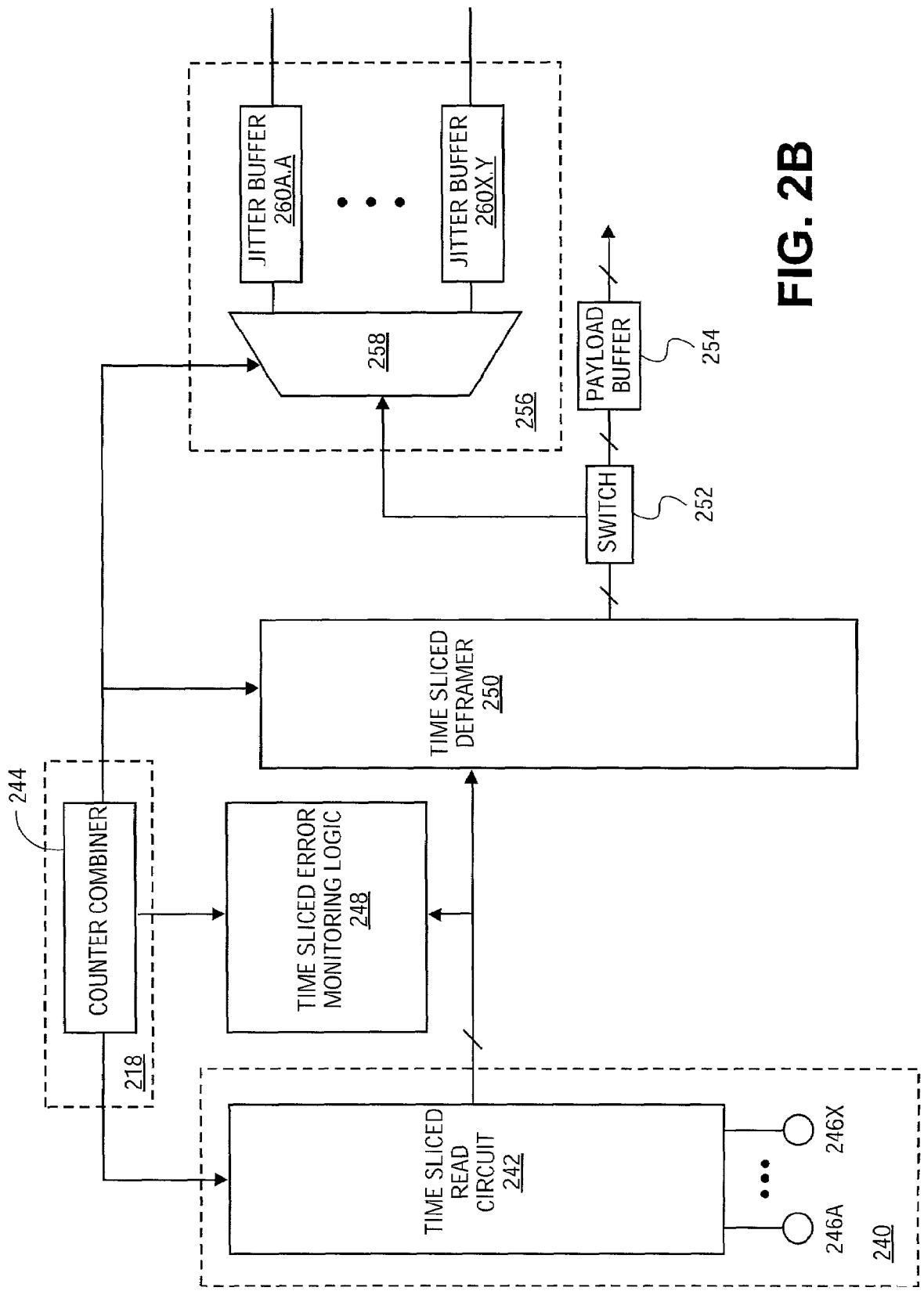
FIG. 2B illustrates a second receive-side portion of a network element line card according to one embodiment of the invention.

FIG. 2B illustrates a second receive-side portion of a network element line card according to one embodiment of the invention. In the illustrated embodiment the global LIU ID is supplied additionally to time sliced error monitoring logic 248, a time sliced deframer 250, and jitter buffer selection demultiplexer 258. Each time a sample of one of the communication signals is detected by the time sliced read circuit, its control components (e.g., a line code violation and/or a loss of signal component) and its data component are respectively provided to time sliced error monitoring logic 248 and the time sliced deframer 250. Time sliced error monitoring logic 248 and time-sliced deframer 250 in the illustrated embodiment use the received global LIU ID to synchronize the receipt and handling of the samples of the communication signals from time sliced read circuit 242 within read unit 240.

In alternative embodiments of the invention, any number of time sliced deframers 250 may be utilized, e.g., a single time sliced deframer 250 for all groups/timeslots, one time sliced deframer 250 per group/timeslot, or any intermediary number and association of time sliced deframers 250. Similarly, a non-time sliced deframer may similarly be implemented in one embodiment of the invention. The output of time sliced deframer 250 may either be provided to one or more payload buffers 254 or to a jitter attenuation unit 256 including a jitter buffer selection demultiplexer 258 to synchronize the receipt of deframed communication signals and a separate jitter buffer 260A.A-260X.Y for each timeslot/communication signal received. Jitter buffers 260A.A-260A.Y may be utilized to compensate for jitter present within the deframed communication signal which may then be transmitted out of the line card/network element via its transmit side line card portion described herein. In alternative embodiments of the invention, various levels of processing may be accomplished on communication signal data between the described receive side and transmit side. Furthermore, in alternative embodiments of the invention the coupling between a given receive-side communication signal LIU and transmit-side LIU may be predefined and fixed, or may be flexible utilizing various cross-connects.

When the switch 252 designates the jitter attenuation unit for a given one of the deframed communication signals, that deframed communication signal is provided to and stored within its associated one of jitter buffers 260A.A-260A.Y utilizing its own captured clock. The deframed communication signals (e.g., a communication signal data component) may be retrieved utilizing the communication signal's captured clock, its original extracted clock component, or an external clock other than the sampled or extracted clock from the jitter buffer 260 in which it is stored. An "external" clock may be generated or provided from any location and need not necessarily be generated outside or external to communication signal processing unit 216 or its associated network element line card.

Where a communication signal's captured or extracted clock component is used to retrieve it from the jitter buffer 260 where it is stored, the jitter buffer 260 will compensate for the "sampling" jitter introduced by the previous sampling operations described herein. However, where an external clock signal is used to retrieve a communication signal from its jitter buffer 260, the communication signal's jitter buffer will compensate for both "sampling" jitter and "external clock jitter."

Figure 3:
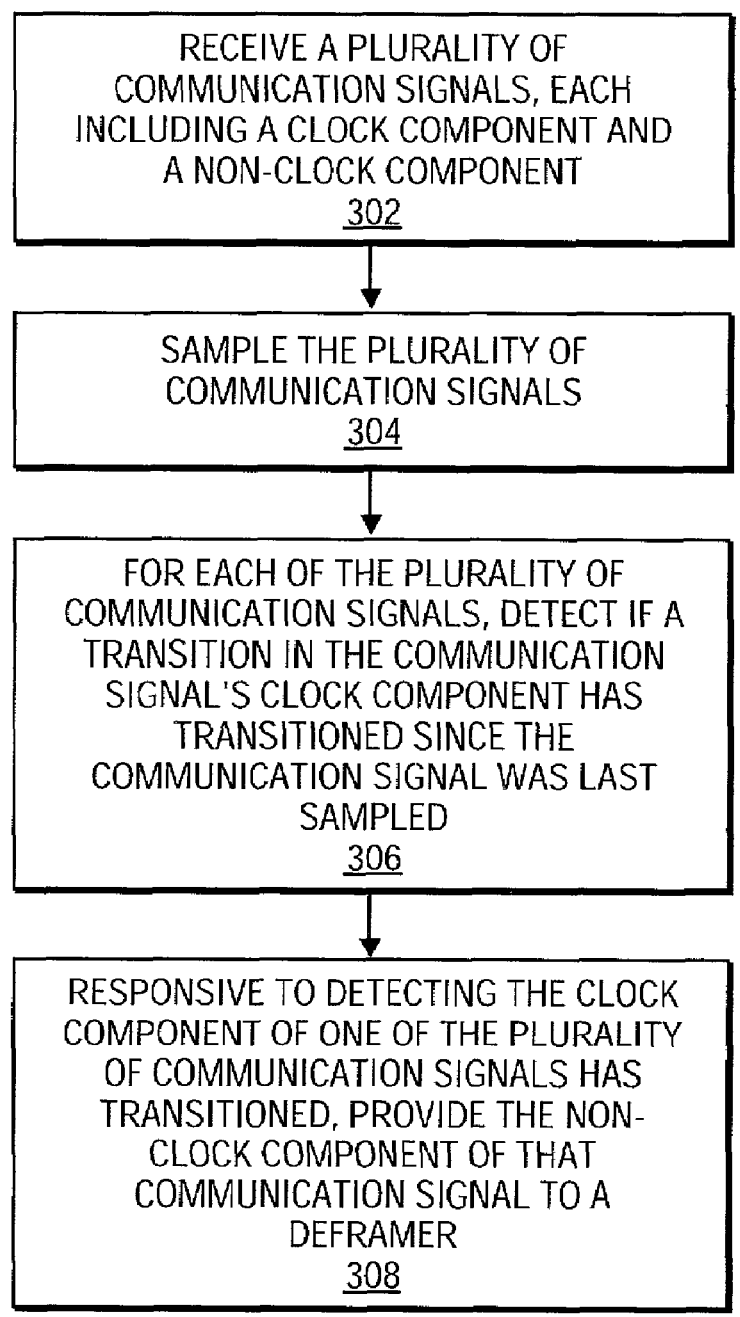
FIG. 3 illustrates a flow diagram of a communication signal reception process according to one embodiment of the invention.

FIG. 3 illustrates a flow diagram of a communication signal reception process according to one embodiment of the invention. At process block 302, a plurality of communication signals are received, each including a clock component and least one non-clock component. Thereafter, at process block 304, the plurality of communication signals are sampled. According to one embodiment of the invention, this is performed via a receive-side LIU sampling unit 208 such as is illustrated in FIG. 2A. At process block 306, for each of the plurality of communication signals, it is detected if a transition has occurred in that communication signal's clock component since the communication signal was last sampled. According to one embodiment, this detection may be performed utilizing receive-side edge detection logic 226 as is illustrated in FIG. 2A. Next, in process block 308, responsive to detecting the clock component of one of the plurality of communication signals has transitioned, the non-clock components of that communication signal are provided to a deframer and/or error detection logic. With reference to the example of FIG. 2, a non-clock component of a communication signal whose clock component has transitioned since the communication signal was last sampled is provided to the time sliced deframer 250. According to one embodiment of the invention, this is performed utilizing read unit 240 of FIG. 2A.

Figures 1, 4A:
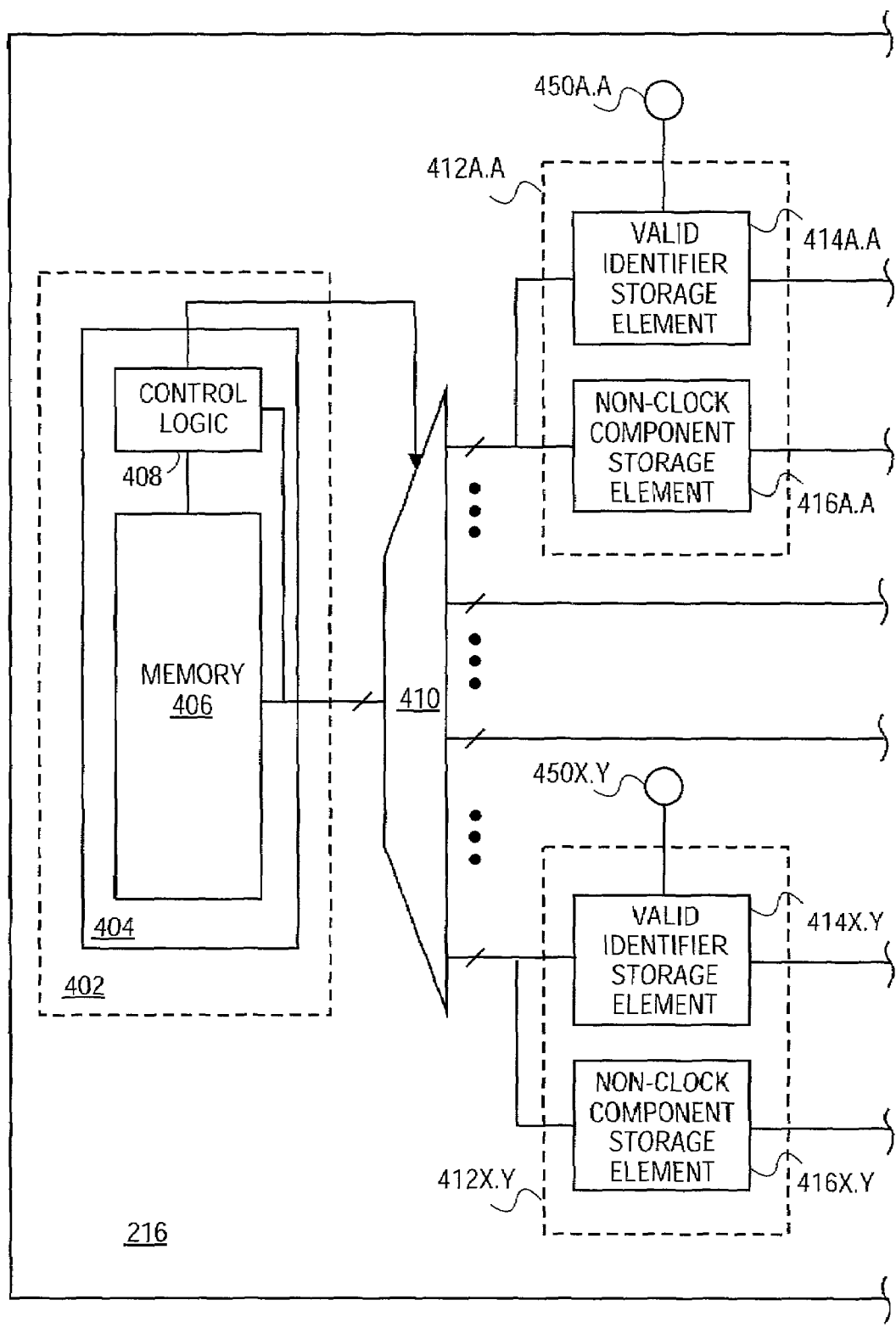
FIG. 4A, including
Figures 2, 4A:
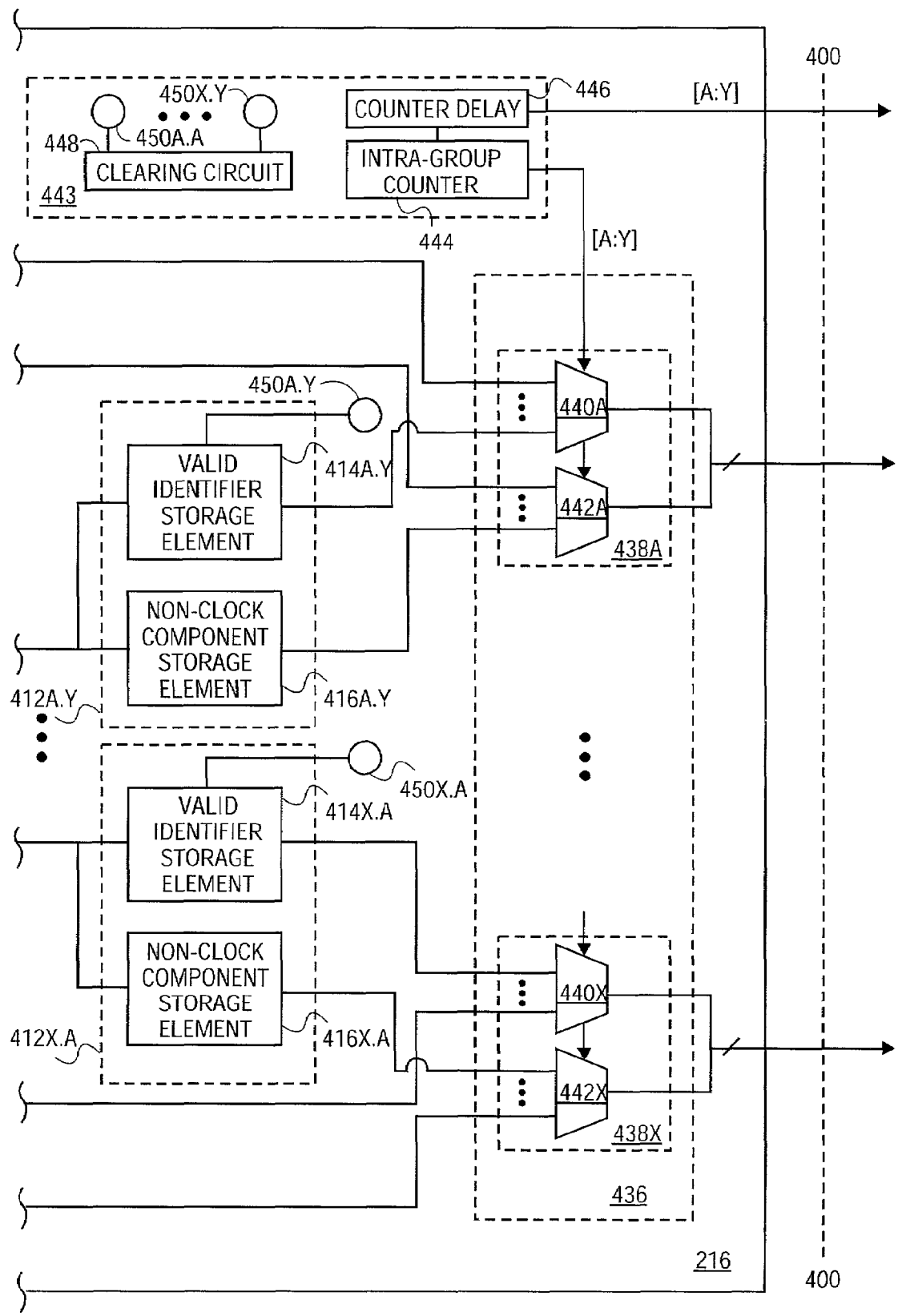

FIG. 4A illustrates a first transmit-side portion of a network element line card according to one embodiment of the invention. In the illustrated embodiment, communication signal processing unit 216 includes a write unit 402, a transmit-side control unit 443, a transmit-side write unit communication signal demultiplexer 410, a number of transmit-side communication signal processing unit storage element groups 412A.A-412X.Y, and a transmit-side communication signal processing unit multiplexing unit 436. Write unit 402 of the illustrated embodiment includes a time sliced write circuit 404 having control logic 408 and a memory 406 to store a number of communication signals.

Memory 406 may include any of a number of memory storage devices such as random access memory (RAM), flash memory, etc. and may store communication signals in various ways. For example, memory 406 may store all of the communication signals simultaneously or may store a fraction of the total number of communication signals on an as-needed basis.

In the illustrated embodiment, memory 406 includes sufficient storage to store a non-clock component (e.g., a data component) for each of a number of communication signals corresponding to the number of line card ports or outputs available and provides the stored non-clock components to transmit-side write unit communication signal demultiplexer 410. Control logic 408 generates a slot for each communication signal having a non-clock component stored within memory 406. The slots may be generated sequentially, or in other embodiments, according to alternative slot-generation schemes (e.g., random). Control logic 408 utilizes the generated slots in turn to identify, via a control input, a communication signal for transmit-side write unit communication signal demultiplexer 410 and to identify a non-clock component corresponding to the identified communication signal within memory 406.

Control logic 408 then provides the identified non-clock component and a valid identifier which indicates the presences of valid non-clock component data and serves as the basis for a communication signal clock component to be generated via an input to transmit-side write unit communication signal demultiplexer 410. Each non-clock component and valid identifier received by transmit-side write unit communication signal demultiplexer 410 is then demultiplexed for storage into a transmit-side communication signal processing unit non-clock component storage element 416A.A-416X.Y and a transmit-side valid identifier storage element 414A.A-414X.Y, respectively, within one of transmit-side communication signal processing unit storage groups 412A.A-412X.Y. The stored valid identifiers and non-clock components may then be subsequently multiplexed utilizing transmit-side communication signal processing unit multiplexing unit 436 for transmission out of communication signal processing unit 216 across a boundary illustrated by dashed line 400.

While a single transmit-side communication signal processing unit non-clock component storage element 416 has been depicted for each transmit-side communication signal processing unit storage group 412, alternative embodiments of the invention may be utilized with communication signals having any number of non-clock components and may include any number of transmit-side communication signal processing unit non-clock component storage elements 416 per storage group.

Transmit-side communication signal processing unit multiplexing unit 436 of the illustrated embodiment includes a number of transmit-side communication signal processing unit multiplexer circuits 438A-438X, each including a transmit-side communication signal processing unit valid identifier multiplexer 440A-440X and a transmit-side communication signal non-clock component multiplexer 442A-442X. While FIG. 4A illustrates a network element line card portion including multiple transmit-side communication signal processing unit multiplexer circuits 438A-438X, alternative embodiments of the invention may include a single transmit-side communication signal processing unit multiplexer circuit 438.

Similarly, while the illustrated embodiment is depicted as including the same number ("A-X") of individual transmit-side communication signal processing unit multiplexer circuits 438A-438X as the number of receive-side LIU sampling circuits 210A-210X and receive-side capture circuits 224A-224X of FIG. 2A according to the previously described labeling scheme, in alternative embodiments of the invention the grouping of communication signals (i.e., transmit-side communication signal processing unit multiplexer circuits 438A-438X, receive-side LIU sampling circuits 210A-210X, etc.) may vary between the receive-side and the transmit-side.

In the illustrated embodiment, transmit-side communication signal processing unit valid identifier multiplexers 440A-440X and transmit-side communication signal non-clock component multiplexers 442A-442X are controlled utilizing a transmit-side intra-group counter 444 (counting from A to Y in the illustrated embodiment) generated within a transmit-side control unit 443. Transmit-side intra-group counter 444 may be a unique and independent counter as shown, or may, in an alternative embodiment be the same as receive-side intra-group counter 220 of FIG. 2A or derived there from. Transmit-side control unit 443 further includes a transmit-side intra-group counter delay 446 coupled to transmit-side intra-group counter 444 as shown and a transmit-side clearing circuit 448 having a transmit-side valid identifier control signal 450A.A-450X.Y for each transmit-side valid identifier storage element 414A.A-414X.Y and corresponding communication signal.

As each communication signal (non-clock component and valid identifier) is received and demultiplexed by transmit-side write unit communication signal demultiplexer 410 and stored within its corresponding transmit-side communication signal processing unit storage element group 412A.A-412X.Y, the value of the valid identifier stored within the group's transmit-side valid identifier storage element 414A.A-414X.Y is modified to indicate the presence of valid non-clock component data within the group's transmit-side communication signal processing unit non-clock component storage element 416A.A-416X.Y. As previously described, the generation of slots and consequently these operations may occur non-sequentially.

According to one embodiment of the invention, clearing circuit 448 generates transmit-side valid identifier control signals 450A.A-450X.Y to sequentially modify (e.g., reset or clear) the values of the valid identifiers stored within transmit-side valid identifier storage elements 414A.A-414X.Y to indicate the absence of valid non-clock component data. For example, in one embodiment, the receive-side global LIU ID output from combined counter 244 within control unit 218 illustrated in FIG. 2A is utilized to sequentially select a stored valid identifier for clearing. Consequently, a conflict or "race condition" exists in such an embodiment when both the slot currently being generated by the control logic 408 identifies the same transmit-side communication signal processing unit storage element group 412 as the clearing circuit 448 (in other words, if such race condition is not taken into consideration, it is possible that a valid identifier value may be cleared from a transmit-side valid identifier storage element 414 before the valid non-clock component data within a corresponding transmit-side communication signal processing unit non-clock component storage element 416 is read).

Accordingly, in one embodiment of the invention a determination is made prior to modifying a valid identifier value whether the current slot and the receive-side global LIU ID reference the same communication signal/transmit-side valid identifier storage element 414 (e.g., if their values are equal). If so, the current slot wins and the signal of the clearing circuit 448 is ignored.

Figures 1, 4B:
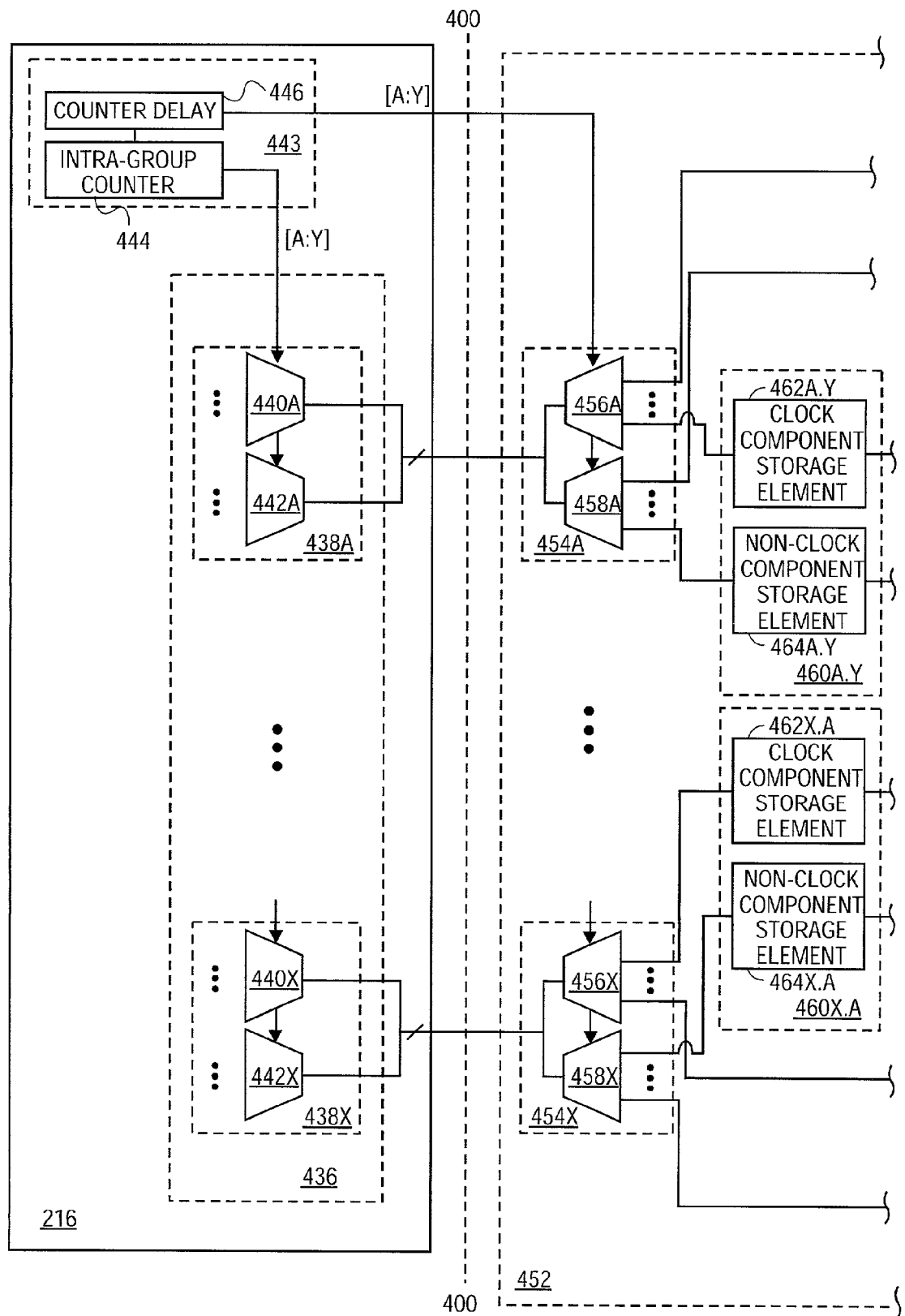
FIG. 4B, including
Figures 2, 4B:
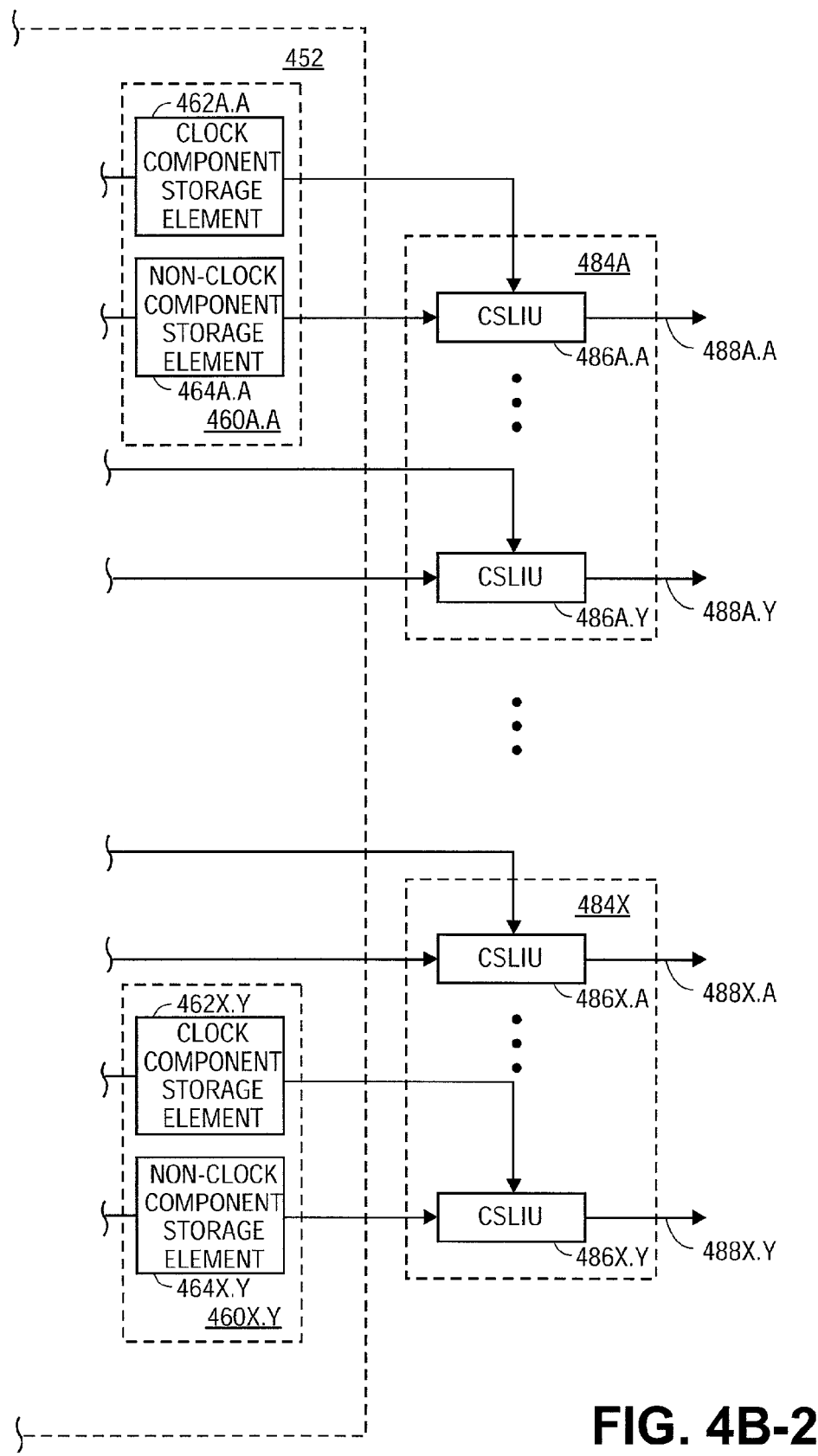

FIG. 4B illustrates a second transmit-side portion of a network element line card according to one embodiment of the invention. In the illustrated embodiment, valid identifier and non-clock component output is transmitted across the boundary illustrated by dashed line 400 from each transmit-side communication signal processing unit multiplexer circuit 438A-438X within communication signal processing unit 216 to a corresponding transmit-side communication signal processing unit demultiplexing circuit 454A-454X within a transmit-side communication signal processing unit demultiplexing unit 452. Each transmit-side communication signal processing unit demultiplexing circuit 454A-454X includes a transmit-side valid identifier demultiplexer 456A-456X to demultiplex received valid identifiers and a transmit-side non-clock component demultiplexer 458A-458X to demultiplex received non-clock components, both controlled utilizing the delayed transmit-side intra-group counter value output of transmit-side intra-group counter delay 446 within transmit-side control unit 443.

The demultiplexed valid identifiers and non-clock components are then provided from each transmit-side communication signal processing unit demultiplexing circuit 454A-454X to a number of corresponding transmit-side demultiplexing unit storage element groups 460A.A-460X.Y for storage. Each transmit-side demultiplexing unit storage element group 460A.A-460X.Y includes a transmit-side clock component storage element 462A.A-462X.Y and a transmit-side demultiplexing unit non-clock component storage element 464A.A-464X.Y. In the illustrated embodiment, a communication signal's valid identifier value, generated by write unit 402 of FIG. 4A, is stored within the communication signal's corresponding transmit-side clock component storage element 462 and serves as the clock component for the outgoing communication signal. Consequently additional jitter (referred to herein as "generated clock jitter") caused by the variation between a communication signal's original clock component and the "generated" valid-identifier-based clock component is introduced into each communication signal transmitted. According to one embodiment of the invention, such generated clock jitter is compensated utilizing a jitter buffer within the communication signal's corresponding transmit-side communication signal LIU 486A.A-486X.Y.

For each transmit-side demultiplexing unit storage element group 460A.A-460X.Y of the illustrated embodiment, there is a corresponding transmit-side communication signal LIU 486A.A-486X.Y within a corresponding transmit-side LIU group 484A-484X. A clock component, stored within a transmit-side clock component storage element 462 of a given transmit-side demultiplexing unit storage element group 460 is provided to a control input of a corresponding communication signal LIU 486 to control the receipt of a non-clock (e.g., data) component provided to the communication signal LIU 486 from the transmit-side demultiplexing unit storage element group 460 for each of the depicted transmit-side demultiplexing unit storage element groups 460A.A-460X.Y. Each communication signal LIU 486A.A-486X.Y in turn transmits a communication signal including an encoded non-clock component and clock component via one or more communication signal lines 488A.A-488X.Y.

According to one embodiment of the invention, communication signal processing unit 216 is implemented within an application-specific integrated circuit operating based upon a first clock signal and receive-side LIU sampling unit 208 and transmit-side communication signal processing unit demultiplexing unit 452 are implemented within one or more programmable logic devices (PLDs) operating based upon a second clock signal, where the first clock signal is faster than or of a higher frequency than the second clock signal. For example, in one embodiment, communication signal processing unit 216 operates at a 100 MHz clock signal rate and receive-side LIU sampling unit 208 and transmit-side communication signal processing unit demultiplexing unit 452 operate at a 50 MHz clock signal rate.

Consequently, communication signals are received and multiplexed from and/or demultiplexed and transmitted to communication signal line interface units via less costly and slower operating PLDs which still operate at a sufficient speed to accurately sample and reproduce received and transmitted communication signals. On a receive-side according to one specific exemplary embodiment of the invention, a total of 28 T-1 communication signals having 4 extracted components each (clock, data, LCV, and LOS) are received from line interface units and sampled via multiplexers controlled utilizing a 3-bit intra-group counter operating at 50 MHz.

Each multiplexer selects one of 7 input communication signal components resulting in a sample being taken of a given component input once every 140 ns approximately. As the input T-1 communication signals include a clock component operating at only a 647 ns clock period, the received signal is actually over-sampled by the described embodiment to ensure the correct detection of clock signal transitions indicating the transmission of data components of T-1 communication signals which may include jitter (e.g., external clock jitter). However, since the described sampling occurs either at either a 560 ns or a 700 ns boundary rather than the T-1 signal's 647 ns clock period, approximately ¼ unit interval peak-to-peak (UIPP) sampling jitter is introduced.

Similarly, on a transmit-side according to one specific exemplary embodiment of the invention, a total of 28 T-1 communication signals having 2 components each (clock and data) are received from communication signal processing unit 216, demultiplexed via multiplexers controlled utilizing a 3-bit intra-group counter operating at 50 MHz, and subsequently transmitted via line interface units.

Embodiments of the invention may include a machine-readable medium on which is stored a set of instructions (i.e., software) embodying any one, or all, of the methodologies or processes described herein. For example, software can reside, completely or at least partially, within a memory within a communication signal processing unit. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

FIG. 5 illustrates a receive-side portion of a network element line card according to one embodiment of the invention. While the depicted embodiment shows inputs for only communication signal clock components (LIU#0 Clk-LIU#6 Clk) it will be appreciated that alternative as well as the illustrated embodiment may include similar structures and arrangements for the receipt of any number communication signal components. The illustrated embodiment includes a programmable logic device (PLD) 502 and an application specific integrated circuit (ASIC) 504 (labeled "DDC") separated by a boundary illustrated by a vertical dashed line 500. The majority of the elements of DDC, including signal processing unit 506 operate utilizing a first clock 508, (labeled "cclk"). In one embodiment of the invention, cclk is a 100 MHz clock signal. By contrast, the majority of the elements within PLD 502 operate utilizing a second clock 510, (labeled "T1_Clk0"), generated utilizing the first "cclk" clock signal 508. According to one embodiment, the second "T1_Clk0" clock 510 is a 50 MHz clock signal produced by dividing the first "cclk" 508 by two utilizing clock divider 512 (labeled "BY2").

Figure 6:
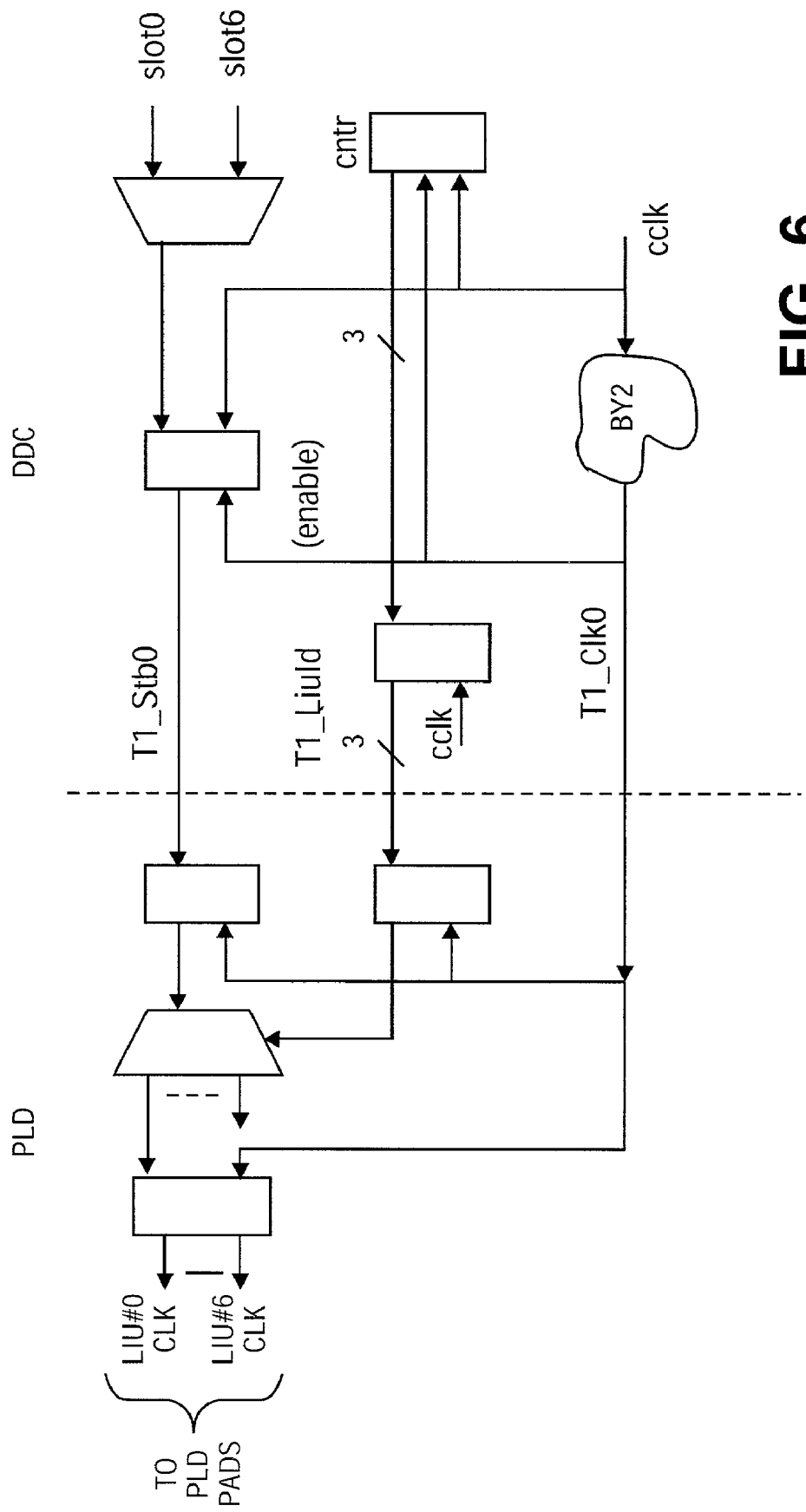
FIG. 6 illustrates a transmit-side portion of a network element line card according to one embodiment of the invention.

FIG. 6 illustrates a transmit-side portion of a network element line card according to one embodiment of the invention. Similar to the embodiment illustrated in FIG. 5, the depicted embodiment shows outputs for only communication signal clock components (LIU#0 Clk-LIU#6 Clk) although it will similarly be appreciated that alternative as well as the illustrated embodiment may include similar structures and arrangements for the transmission of any number communication signal components.

Thus, a method and system of multiplexing and demultiplexing communication signals have been described. In the foregoing description, the invention has been described with reference to specific exemplary embodiments thereof. It will be apparent however, that variations or modifications of the exemplary embodiments described as well as alternative embodiments of the invention may be implemented without departing from the broader spirit or scope of the invention as defined in the appended claims. For example, the order in which the operations of the various process embodiments of the invention may be varied and/or re-ordered, and operations themselves may be expanded or combined to produce a greater or lesser number of operations within the scope of the invention. The specification and drawings are accordingly to be regarded in an illustrative rather than a restrictive sense.

What is claimed is:

1. An apparatus comprising:
   a first sample logic to sample a plurality of communication signals from a plurality of line interface units, where each of the plurality of communication signals includes a clock component and a non-clock component, said plurality of communication signals including a plurality of communication signal groups, said first sample logic including a first multiplexer to receive said clock components and a separate second multiplexer to receive said non-clock components;
   a first counter coupled to a control input of said first multiplexer and said separate second multiplexer;
   a capture unit including,
      a non-clock component storage element coupled to an output of said second multiplexer, and
      edge detection logic coupled to an output of said first multiplexer to detect a transition of a clock component and coupled to a control input of said non-clock component storage element; and
   a second sampling logic coupled to said capture unit to sample a selected group of communication signals of said plurality of groups.

2. The apparatus of claim 1 wherein said first sample logic is implemented within a programmable logic device and said first counter and said capture unit are implemented within an application specific integrated circuit.

3. The apparatus of claim 2 wherein said application specific integrated circuit is operated at a first clock signal frequency and said programmable logic device is operated at a second clock signal frequency and further wherein said first clock signal frequency is higher than said second clock signal frequency.

4. The apparatus of claim 1 wherein said plurality of communication signals comprises a plurality of T1 communication signals.

5. The apparatus of claim 4 wherein said clock component comprises an extracted T1 clock signal.

6. The apparatus of claim 4 wherein said non-clock component comprises an extracted T1 clock signal.

7. The apparatus of claim 1 wherein said first counter is coupled to a control input of said edge detection logic.

8. The apparatus of claim 7 wherein said first counter is coupled to said control input of said edge detection logic via a delay element.

9. The apparatus of claim 1 wherein said capture unit further includes a valid identifier storage element coupled to an output of said edge detection logic.

10. The apparatus of claim 9 further comprising a read circuit coupled to an output of said valid identifier storage element and an output of said non-clock component storage element.

11. The apparatus of claim 10 further comprising a deframer coupled to an output of said read circuit.

12. The apparatus of claim 11 further comprising a jitter attenuation unit including a jitter buffer coupled to an output of said deframer.

13. The apparatus of claim 12 wherein said jitter buffer comprises a jitter buffer to compensate for sampling jitter and external clock jitter.

14. The apparatus of claim 12 wherein said jitter buffer includes a control input coupled to said output of said first multiplexer.

15. The apparatus of claim 14 wherein said output of said first multiplex comprises a sampled, extracted clock signal.

\* \* \* \* \*